Inventor:
Russel D. Snyder

Dec. 16, 1947.  R. D. SNYDER  2,432,694
FLUID SEAL
Filed Nov. 9, 1944   2 Sheets-Sheet 2
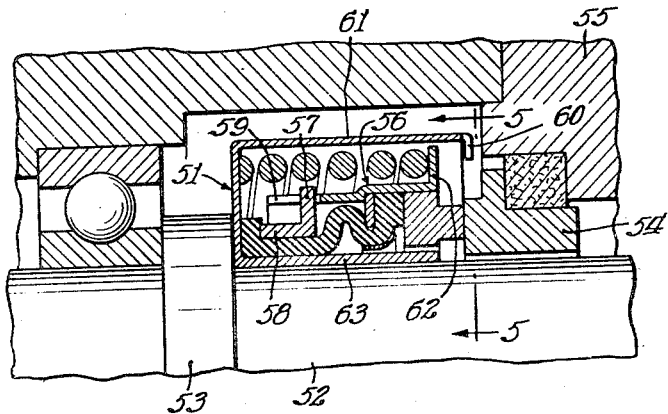
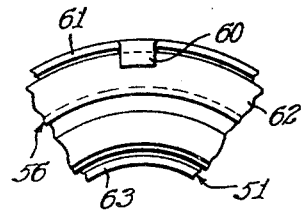
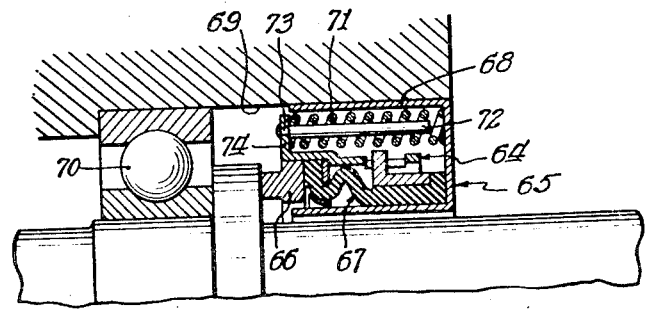
Inventor:
Russel D. Snyder
By: Charles P. Vrytech
Atty.

Patented Dec. 16, 1947

2,432,694

UNITED STATES PATENT OFFICE 2,432,694

FLUID SEAL

Russel D. Snyder, Chicago, Ill., assignor to Crane Packing Company, Chicago, Ill., a corporation of Illinois Application November 9, 1944, Serial No. 562,632

7 Claims. (Cl. 286—11)

This invention relates to seals and particularly to seals of the rotary type such as are used to prevent escape of fluid from between two relatively rotatable elements.

In my prior Patent No. 2,360,372, dated October 17, 1944, there is described a rotary seal which comprises a sealing washer mounted for rotation with a shaft or the like and cooperating with a floating seat which is secured to a stationary housing surrounding the shaft. The sealing washer is driven from the shaft by means of a driving band which drives a retainer shell, the shell in turn having lugs or indentations which fit into corresponding depressions or slots in the sealing washer. A flexible bellows impervious to the fluid to be sealed is clamped to the shaft by the driving band at one end, and its other end is clamped to the sealing washer to form a fluid-tight seal between the shaft and washer. The arrangement is such that it permits axial movement of the washer relative to the driving band in order to take up for wear of the washer and also to allow for axial vibrations of the shaft. The washer is held against the floating seat by a spring which abuts the retainer shell at one end and at the other end abuts a spring holder which is prevented from moving axially of the shaft either by a shoulder on the shaft or by a ring or other element projecting radially from the shaft and fixed against axial movement in one direction relative thereto.

The rotary seal described in the aforesaid patent is thus comprised of several separate elements, viz., the washer, the bellows assembly, the spring and the spring retainer ring, so that in installing the seal on a shaft, the mechanic is required to handle and put in place each of the elements consecutively. This, of course, introduces a personal element which is undesirable since it may result in an improperly installed seal, and is time-consuming as well. In shipping the seal it is likewise desirable to fasten the three parts together so that they may be handled as a unit until ready for installation. In installing the seal it is necessary to clamp the bellows to the shaft so that the shaft forms an integral part of the seal.

It is desirable to eliminate all of the above-mentioned inconveniences and hence the principal object of this invention is to provide a seal construction which will simplify the handling and installation of a rotary seal of the type hereinabove referred to.

A more specific object of this invention is to provide a seal which is so constructed that all of the elements thereof are substantially contained in a single shell which may be readily handled and installed, the shell itself forming the means by which the seal is supported in place.

Another specific object of this invention is to provide a rotary seal which does not require that the flexible sealing element thereof be clamped to the shaft and hence will be simpler to install.

Yet another specific object of this invention is to provide a mechanical drive for a rotary seal utilizing a sealing washer which is extensible to take up for wear of the sealing washer but which provides definite limits to the movement of the washer in either axial direction.

These and other objects and features of this invention will become evident from the following description when taken together with the accompanying drawings in which:

Figure 4 is a section through a modification of a seal showing the application of the seal to a rotating structure such as a shaft;

Figure 5 is a partial side elevation showing the means for retaining the seal of Fig. 4 in the shell; and Figure 6 is a partial side elevation of a further adaptation of the seal of this invention.

Figure 1:
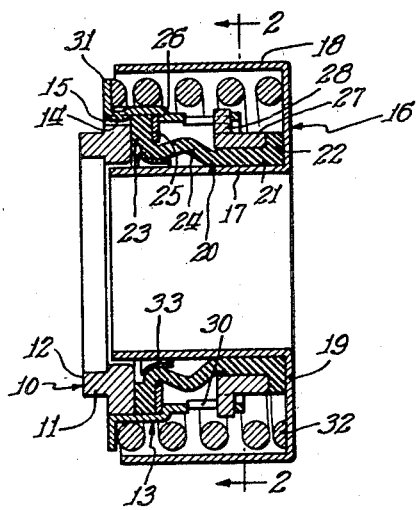
Figure 1 is a section in elevation of a preferred embodiment of the seal.

Referring now specifically to Fig. 1 for a detailed description of the invention, there is shown a washer 10 having a laterally protruding rib or nose 11, the face 12 of which is lapped to form a sealing surface. Said washer 10 is mounted in a driving shell 13 which is provided with radially inwardly extending indentations 14 which fit into slots 15 formed in the periphery of washer 10 to provide a driving connection therebetween.

Shell 13 and washer 10 are mounted in a toroidal shaped container 16 which in the embodiment chosen for illustrating this invention is comprised of an inner cylindrical wall 17, an outer cylindrical wall 18 and a connecting radial wall 19. Said radial wall 16 is shown connecting the right ends (Fig. 1) of cylindrical walls 17 and 18 but obviously it may be located elsewhere along the lengths of the walls without departing from the spirit of this invention. Similarly, walls 17 and 18 need not be cylindrical but may define any desired closed geometric figure. It will be observed that container 16 forms a hollow torus which is open at one side. Within the space defined by walls 17, 18 and 19, is a flexible expansible sleeve 20 of a material impervious to the fluid to be sealed, having a cylindrical portion 21 terminating in a radial flange 22 at one end thereof, and a radial flange 23 at the opposite end thereof. Between cylindrical portion 21 and flange 23, sleeve 20 is in the form of a bellows 24 so that flange 23 may move freely axially relative to cylindrical portion 21 without materially straining any portion of sleeve 20, i. e., without requiring the expenditure of any appreciable force to effect the axial movement.

Figure 2:
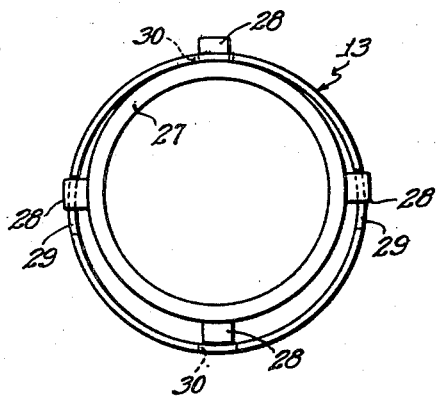
Figure 2 is a side elevation of a portion of the seal taken along line 2—2 of Fig. 1 showing how two of the seal elements may be assembled.

Flange 23 is preferably secured to washer 10 by means of a suitable adhesive such as rubber cement in order to prevent washer 10 from falling out of shell 13. The opposite side of flange 23 abuts a washer 25 which in turn rests against a shoulder 26 formed in shell 13. Cylindrical portion 21 of sleeve 20 is compressed against cylindrical wall 17 of shell 16 by a band 27, preferably made endless so that it can be slipped over the sleeve prior to the insertion of the sleeve into the shell and made to clamp portion 21 against wall 17 without the aid of any tightening means such as screws or the like. Band 27 is formed with radially extending lugs 28, preferably equidistantly spaced about the periphery of band 27 as shown in Figure 2. Said lugs 28 extend through slots 29 and apertures 30 in shell 13. As shown in Figure 2, four lugs are formed on band 27, said lugs being 90° apart. Two lugs cooperate with slots and the remaining two cooperate with apertures. The apertures and slots are larger than the lugs so that band 27 may rotate slightly relative to shell 13 when the two are assembled. The proportions of the band, shell and lugs are such that the internal diameter of shell 13 at the lugs is substantially equal to the external diameter of band 27, plus the radial height of one of the lugs. With such proportions, it is possible to assemble a band into a shell by first inserting one lug 28 into an aperture 30 and one lug 28 into a slot 29 and then rotating the band within the shell and simultaneously pushing the band into the shell until the opposite lug drops into its aperture. The shell 13 may be sprung slightly to accommodate this operation.

Shell 13 is formed with a radial flange 31, the outer diameter of which is less than the internal diameter of cylindrical wall 18. A helical spring 32 is compressed between flange 31 and radial wall 19 so that it is continuously effective to urge shell 13 and its associated washer 10 out of the container 16. A ferrule 33 cooperates with the portion of bellows 24 adjacent flange 23 to space said portion away from inner cylindrical wall 17 thereby to prevent freezing of the sleeve 20 to said wall 18 such as would occur where the sleeve is made from synthetic rubber.

To assemble the seal shown in Figures 1 and 2, a shell 13 is first slipped over the lugs 28 of a band 27 in the manner just described and then a washer 25, a flange 23 of a sleeve 20 and a ferrule 33 are assembled in the order mentioned. Next a spring 32 is placed over shell 13 and the entire assembly is forced into a container 16, the internal diameter of cylindrical portion 21 of sleeve 20 being slightly less than the internal diameter of inner cylindrical wall 17 so that a clamping action is obtained between band 27 and wall 17 to form a fluid-tight seal between the sleeve and inner wall. Finally, a washer 10 is inserted into shell 13 with the slots 15 thereof positioned to receive the indentations 14 on shell 13, suitable rubber cement having been previously applied to the back of washer 10 to cause it to adhere to flange 23.

It will be observed that although spring 32 exerts a constant pressure on sleeve 13 tending to force it out of container 16, the sleeve is restrained because of the interlocking action of the lugs with apertures 30.

After the various elements of the seal have been assembled into the container 16, the entire seal can be handled as a unit. Thus experts at the factory do all the critical assembling which is required and the mechanic in the field need only insert the shell into the space provided for it, exercising only that amount of care which is required to make sure that sealing face 12 of washer 10 is properly in contact with whatever sealing surface is provided in the apparatus to be sealed. The device shown in Figure 1 is self-contained and is shipped as a unit without requiring any tying of the parts together, and since container 16 surrounds substantially the entire mechanism with the possible exception of nose 11 of washer 10, all parts of the seal are protected against damage in transit. The cylindrical walls 17 and 18 can be made of any axial length to provide as much or little protection as desired. However, the outer wall is preferably such that when spring 32 urges shell 13 to the left as far as the lugs 28 in apertures 30 will permit, substantially only the flange 31 on shell 13 will protrude from the container. The inner wall 17 should be long enough to provide some support for washer 10 since the washer and shell are unsupported except for the flexible bellows 24 which is not sufficiently rigid. The supporting action of wall 17 is of a limited nature, however, since washer 10 should have a certain degree of freedom to adjust itself to weaving of the cooperating sealing surface.

Figure 3:
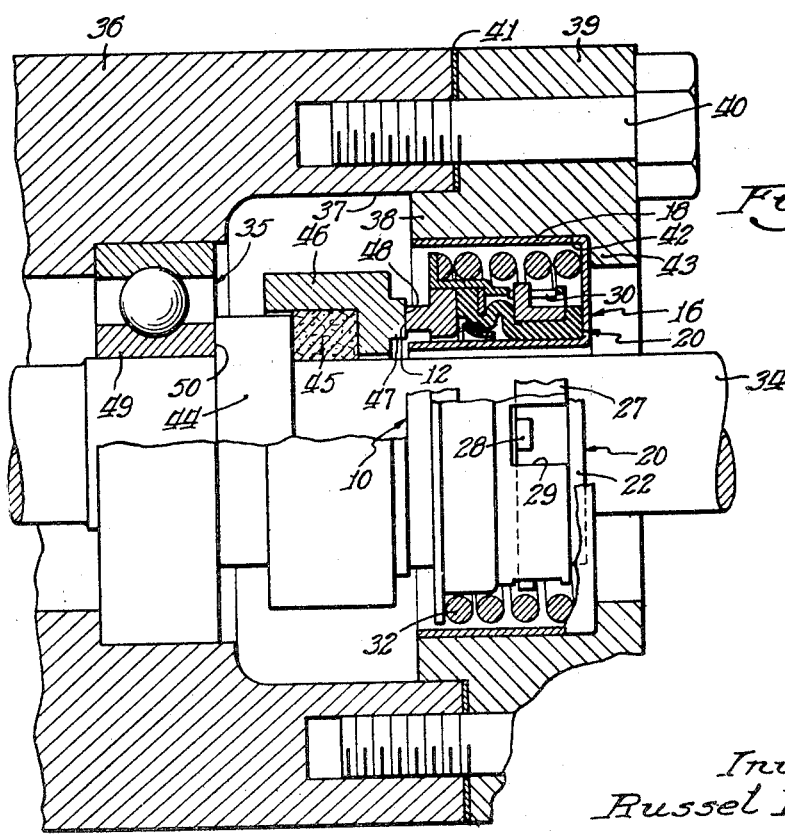
Figure 3 is an elevation partly in section of a structure to which the seal of this invention may be applied.

Referring now to Figure 3 for an illustrative application of the seal of Figure 1 to a structure to be made fluid-tight, there is shown a shaft 34 which is supported by an anti-friction device such as ball-bearing 35 from a frame or housing 36 which may be stationary. Said housing 36 has a machined bore 37 into which is inserted the shoulder 38 of a closure member or plate 39, said closure member being secured to frame 36 by means of bolts 40 or other fasteners. A gasket 41 may be used to seal the joint between frame 36 and closure member 39. Said closure member 39 is provided with a bore 42 which is of lesser depth than the thickness of closure plate 39 so as to leave an abutment 43 near the outside of the closure member. The diameter of bore 42 is such that container 16 may be received therein with a snug fit between the outside of cylindrical wall 18 and bore 42. The joint between container 16 and bore 18 must be sufficiently snug to prevent the escape of fluid therebetween.

Shaft 34 may be provided with a shoulder 44 which acts as an abutment for ball-bearing 35 on one side and for a compressible sealing ring 45 on the other side. Alternatively the abutment may be a ring which is forced upon, or secured to, shaft 34. Surrounding ring 45 is a sealing ring 46 which is formed at its right-hand side (Figure 3) with a rib 47 ground and lapped at its vertically disposed face 48 to provide a sealing surface against which lapped face 12 of washer 10 may bear.

With the sealing unit applied to a structure such as is shown in Figure 3, the unit may be readily removed and replaced by removing closure member 39, pulling out the container 16, and replacing it with a new unit and then re-mounting the closure member 39 on housing 36. If only the sealing washer 10 is worn, then the washer alone may be removed and replaced while closure member 30 is dismounted from frame 36. It will be noted that outer cylindrical wall 18 performs the dual function of protecting the seal and of supporting the seal in the machine or apparatus.

Although washer 10 is shown cooperating with a ring 46 which is especially designed for this apparatus, it is obvious that washer 10 may be made to cooperate directly with shoulder 44, provided the radial surface thereof has been previously ground and lapped. Alternatively, washer 10 may cooperate directly with the race 49 of ball-bearing 35 if the side 50 of said race has likewise been previously ground and lapped. In each of these modified constructions, it is understood that the closure member will likewise be modified.

Referring to Figures 4 and 5 for a description of another application of the self-contained seal of this invention, it will be observed that container 51 is pressed directly upon a shaft 52 against an enlarged portion 53, either formed integrally with the shaft or formed separately and suitably secured thereto. In this construction the sealing ring 54 is mounted on a closure member 55, the said member 55 being removable in the manner shown in Figure 3. It is understood of course that the joint between container 51 and shaft 52 is fluid-tight. In this form, the inner cylindrical wall 63 constitutes the support for the unit instead of the outer wall 61.

The construction of shell 56 in Figure 4 is different from that shown in Figure 1 in that no apertures are used, the lugs 57 of band 58 cooperating with slots 59 in the end of shell 56. This construction is similar to that shown in the aforesaid patent. The limitation to movement of shell 56, instead of being brought about by apertures, is supplied by tabs 60 which are formed in the end of the outer cylindrical wall 61 of container 51 and bent radially inwardly after all of the elements of the seal are assembled in the container. Said tabs 60, when so bent over, project into the path of movement of flange 62 on shell 56 and hence limit the outward movement of the shell and associated mechanism, thus securing the same effect as the apertures and lugs of Figures 1 and 2.

Another manner in which the seal unit of this invention may be used is shown in Figure 6. In this form the shell 64, container 65, sealing washer 66, and flexible sleeve 67 are identical with the corresponding elements of Figure 3. The closure member, however, has been dispensed with and the outer cylindrical wall 68 has been pressed directly into the bore 69 for ball-bearing 70. In addition, a series of coil springs 71 are used in place of the single helical spring for more accurate control of spring pressure. The coil springs 71 are mounted on pins 72 which have a reduced end 73 passing through holes punched in flange 74 of shell 64. The protruding ends are upset to lock the pins in place.

Although this invention has been described with reference to a seal for rendering substantially fluid-tight a chamber formed between a shaft and a stationary housing, obviously the seal may be employed with equal facility in a chamber formed by two rotating elements, one of which is rotatable relative to the other, such for example as the fluid couplings used to transmit torque in automobile drive lines and the like. It is also obvious that the specific composition of the sealing washer and cooperating sealing ring is not material to this invention and hence may vary within wide limits to suit the particular requirements of the installation.

It will be observed from the foregoing description that there has been provided a sealing element which is completely self-contained, which is protected while in transit by a substantially rigid shell, and which is assembled at the factory by experts so that it will not be necessary for the mechanic installing the seal to exercise any skill other than that required to press a container either into an opening provided for it or upon a shaft or other rotating member.

It is understood that the foregoing description is merely illustrative of the preferred embodiments of this invention and that the scope of this invention therefore is not to be limited thereto, but is to be determined by the appended claims.

What is claimed is:

1. A seal for preventing escape of fluid from between two relatively rotatable structures, said seal comprising a region on one structure having a sealing surface, a washer having a sealing surface thereon adapted to cooperate with the sealing surface on the said one structure, a cylindrical region on the other structure, a resilient compressible sleeve having a radially extending flange on one end and a cylindrical region on the other end thereof, a metallic band clamping the cylindrical region of the sleeve to the cylindrical region on the structure, a shell surrounding the resilient sleeve, said shell having at one end a driving connection with the washer and a shoulder against which the washer abuts, and apertures at the other end; radially extending protuberances on the band extending into the apertures, and resilient means urging the shell and washer toward the sealing surface on said one structure, the protuberances extending into the apertures serving to limit movement of the shell in such direction.

2. In a seal for preventing escape of fluid from between two relatively rotatable structures, the sub-combination comprising a cylindrical support, a sealing washer, a resilient expansible sleeve, a band for compressing one end of the sleeve against the cylindrical support, a shell concentrically disposed with respect to the sleeve and having a driving connection with the washer, said shell having at least two apertures in one region thereof, and lugs formed integrally with the band adapted to extend into the apertures to form a driving connection between the band and shell.

3. In a seal for preventing escape of fluid from between two relatively rotatable structures, the sub-combination comprising a cylindrical support, a sealing washer, a resilient expansible sleeve, a band for compressing one end of the sleeve against the cylindrical support, a shell surrounding the sleeve and having a driving connection with the washer, said shell having at least two apertures, and lugs in the band adapted to extend into the apertures to form a driving connection between the band and shell, the internal diameter of the shell at the apertures being substantially equal to the sum of the external diameter of the band and the radial height of one lug.

4. In a seal for preventing escape of fluid from between two relatively rotatable structures, the sub-combination comprising a cylindrical support, a sealing washer, a resilient expansible sleeve, a band for compressing one end of the sleeve against the cylindrical support, a shell surrounding the sleeve and having a driving connection with the washer, said shell having two slots spaced substantially 180° apart and two apertures substantially 180° apart, a slot being spaced substantially 90° from an aperture, and lugs on the band adapted to extend into the apertures and slots to form a driving connection between the band and shell, the internal diameter of the shell at the apertures being greater than the sum of the external diameter of the band and the radial height of one lug, but less than the sum of the external diameter of the band and twice the radial height of one lug.

5. A seal for preventing escape of fluid from between two relatively rotatable structures, said seal comprising an element on one structure having a sealing surface thereon, a washer having a sealing surface thereon adapted to cooperate with the first-mentioned sealing surface to form a substantially fluid-tight joint, a torroidal container supported from the other of said structures and comprising inner and outer substantially cylindrical walls connected by a radial wall, a resilient expansible sleeve, means for securing one end of the sleeve to the washer, a band for compressing the other end of the sleeve against one of the cylindrical walls, a shell having at least two apertures and having a driving connection with the washer, lugs on the band adapted to extend into the apertures, said lugs being axially movable in the apertures to form a lost motion driving connection between the band and shell, and resilient means compressed between the shell and radial wall continuously to urge the washer against the sealing surface.

6. A seal for preventing escape of fluid from between a shaft and a stationary structure, said seal comprising an element on the shaft having a sealing surface thereon, a washer having a sealing surface thereon adapted to cooperate with the first-mentioned sealing surface to form a substantially fluid-tight joint, a container comprising inner and outer substantially cylindrical walls connected by a radial wall, said container being mounted on the stationary structure with the outer wall in substantially fluid-tight contact with the structure, a resilient expansible sleeve, means for securing one end of the sleeve to the washer, a band for compressing the other end of the sleeve against the inner cylindrical wall within the container, a shell having at least two apertures spaced 180° apart and having a driving connection with said washer, lugs on the band adapted to extend into the apertures to form a driving connection between the band and shell, and resilient means compressed between the shell and radial wall continuously to urge the washer against the sealing surface.

7. A seal for preventing escape of fluid from between two relatively rotatable structures, said seal comprising a region on one structure having a sealing surface, a washer having a sealing surface thereon adapted to cooperate with the sealing surface on the said one structure, a cylindrical region on the other structure, a resilient compressible sealing sleeve having a radially extending flange on one end and a cylindrical region on the other end thereof, a metallic band clamping the cylindrical region of the sleeve to the cylindrical region on the said other structure, a shell surrounding the resilient sleeve and having at one end a driving connection with the washer and at the other end a plurality of slots, said shell being adapted to transmit an axial force to the flange on the sleeve to hold the flange against the washer, lugs on the band extending into the slots, certain of said lugs having a circumferential dimension substantially equal to the circumferential dimension of the slots, means on certain of the slots at least partially closing the ends of the slots nearest the end of the sleeve such that the lugs are prevented from leaving the said slots, whereby to prevent a separation of the shell and band, and resilient means compressed between the shell and said other structure for urging the washer against the sealing surface on the said one structure, the resilient means tending to separate the shell and band.

RUSSEL D. SNYDER.

REFERENCES CITED

The following references are of record in the file of this patent:

UNITED STATES PATENTS

| Number | Name | Date |
|---|---|---|
| 2,250,348 | Beier | July 22, 1941 |
| 2,365,351 | Matter | Dec. 19, 1944 |
| 2,382,960 | Compton et al. | Aug. 21, 1945 |
| 2,290,776 | Stillwagon | July 21, 1942 |
| 2,360,372 | Snyder | Oct. 17, 1944 |
| 2,249,930 | Bailey et al. | July 22, 1941 |